June 22, 1965 F. A. FAVILLE 3,190,109
CALIBRATING AND TESTING METHODS
Filed April 2, 1963 3 Sheets-Sheet 1
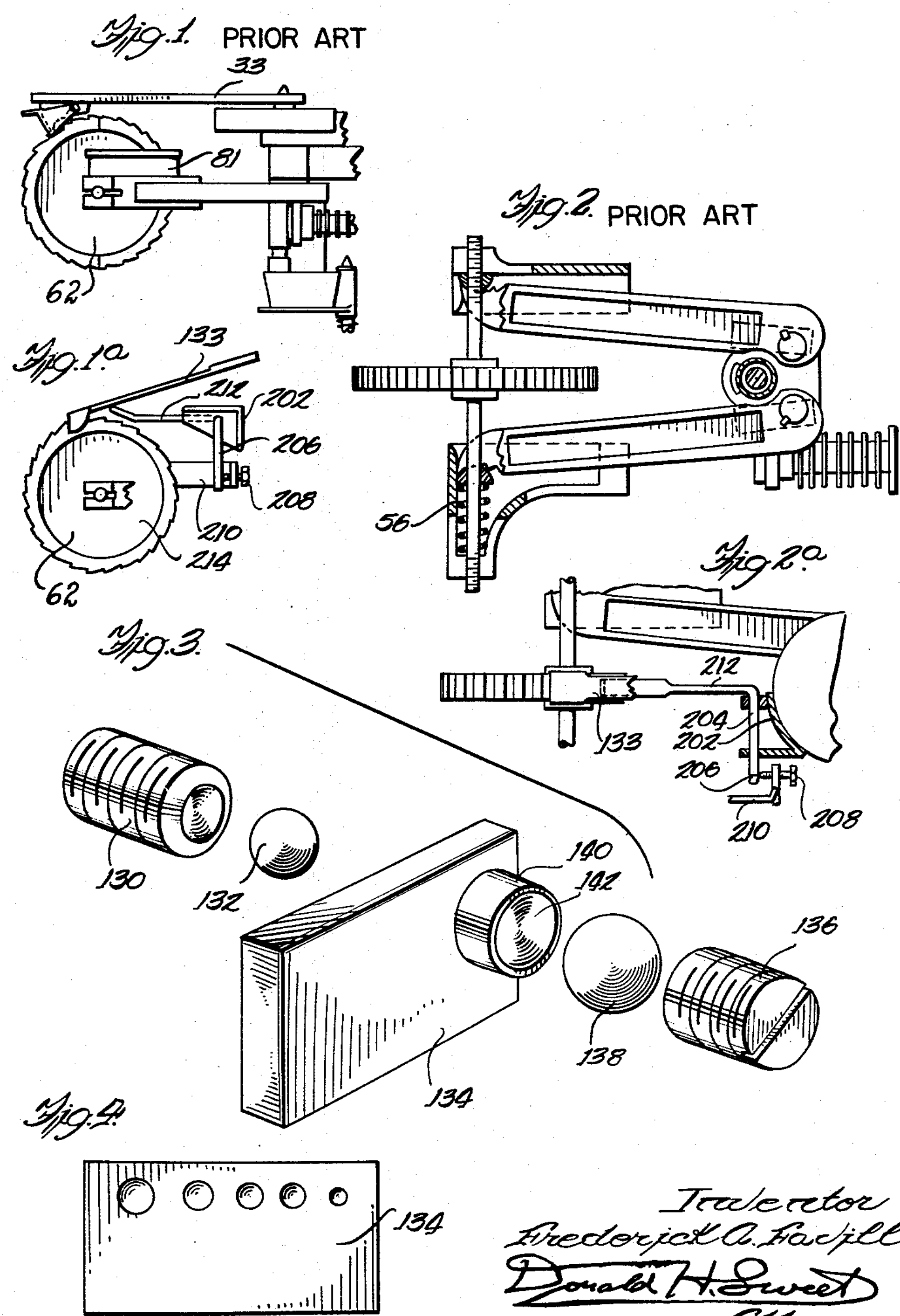
Inventor
Frederick A. Faville
Donald H. Sweet
Attorney June 22, 1965 F. A. FAVILLE 3,190,109
CALIBRATING AND TESTING METHODS
Filed April 2, 1963 3 Sheets-Sheet 2
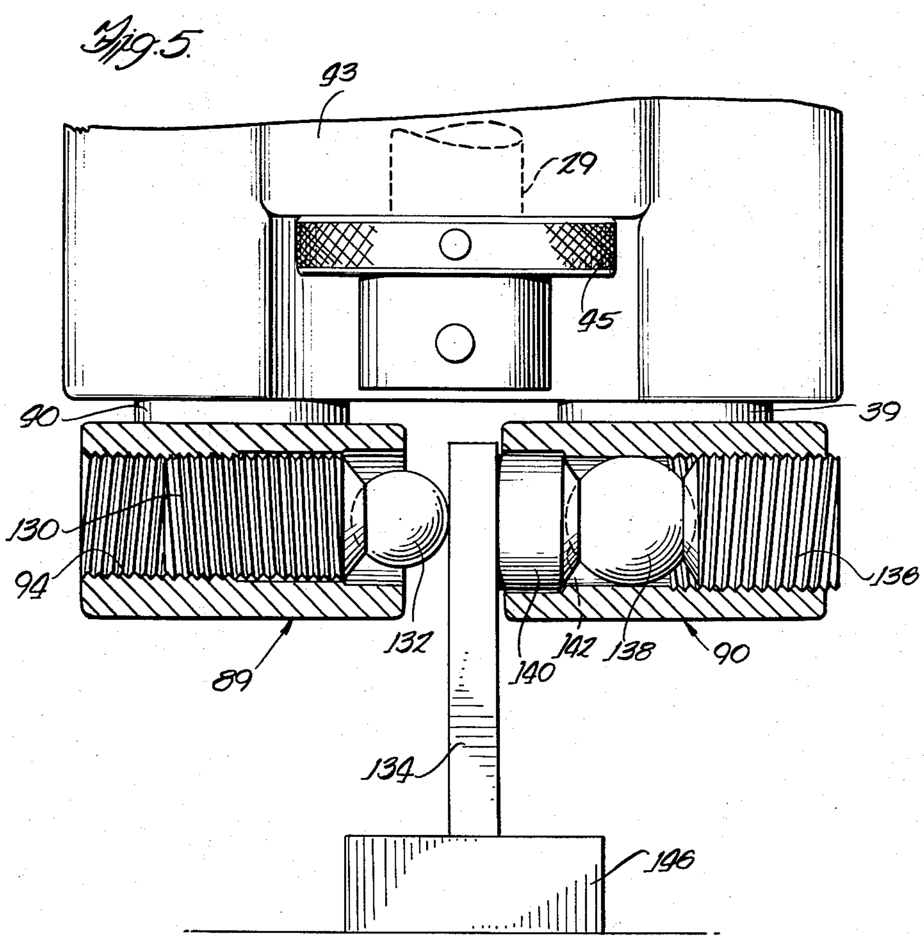
Inventor
Frederick A. Faville
Donald H. Sweet
Attorney June 22, 1965 F. A. FAVILLE 3,190,109

CALIBRATING AND TESTING METHODS

Filed April 2, 1963 3 Sheets-Sheet 3

Inventor
Frederick A. Faville
Donald H. Sweet
Attorney

United States Patent Office 3,190,109

Patented June 22, 1965

3,190,109

CALIBRATING AND TESTING METHODS

Frederick A. Faville, 1500 Hinman Ave., Evanston, Ill.

Filed Apr. 2, 1963, Ser. No. 269,991
6 Claims. (Cl. 73—1)

My invention relates to the basic calibration of precision testing machines of high sensitivity, and includes among its objects and advantages an increase in the ratio between the accuracy and the sensitivity of such machines.

Over the last three or four decades, the accelerated development and increased speeds of rotating machinery, and the competitive demand for continually reduced size of gears and bearings has intensified the demand for improved lubricants to take care of several varieties of service conditions of greatly increased severity.

But the inordinate cost in money, and, more especially, in time, to conduct actual service performance tests under a wide variety of conditions and over periods of at least several months and under many circumstances, several years, has made resort to accelerated bench tests substantially imperative.

To mention only one of many types of service, the use of extreme pressure base additives to produce lubricants for carrying exceptionally heavy loads, has been one of the very active fields.

For this, and for many other types of lubricant, and types of service, a number of accelerated bench tests and machines for performing such tests have been developed. These include those known in the industry as Falex, Timken, Alman, Floyd, Shell 4-Ball, SAE, and Hartmann—modified MacMillan.

The first mentioned machine is disclosed in United States Patent 2,106,170 issued Jan. 25, 1938. The present invention was first practiced with the machine of that patent, and it will be described herein as employed in that connection. The invention is believed to be applicable to many other machines and types of test.

Many of these accelerated tests have gained enough acceptance so that standardized procedures are in use for manufacturing control and to qualify lubricants. Qualified specifications of the present day require that bench testers be highly standardized, so that research formerly carried out in one laboratory can now be applied to results obtained on literally hundreds of machines scattered not only in all parts of the United States, but in foreign countries as well. To this end a degree of precision and of exact repeatability is now required that did not previously exist.

In endeavoring to calibrate a multiplicity of Falex test machines, so that identical gauge loads would result in identical loads on the specimen, many attempts at cross-calibration were explored, and many failures were experienced. The resulting loads from a given application of weight were checked for the spring itself; again for the result of the spring and gauge movement, which involves an intermediate linkage; again for the result of a given load as registered on the gauge movement with the load imposed on the end of the loading arm through spring gauges, both on the arms and on the jaws of the machine itself. The configuration of the point of application of the load at the jaw of the machine involves so much restriction of space that normal means of determining loads at that point cannot be readily applied.

It is emphasized that many of the phenomena to be observed, or tested, involve critical changes in the nature of the material being tested, and that these changes themselves are not a continuous function of the applied load. There are also minute mechanical differences in the arms and bearing surfaces of the machine itself, especially in connection with high spots in such varying surfaces. In addition, as additional force is applied to the machine, deflection and distortion change the relative positions of these bearing surfaces, making the exact load applied at the jaw of the machine difficult or impossible to determine of estimate with the desired precision in comparing one machine with another machine, especially when one of the machines has been in use for a considerable period of time.

Eventually, the Gordian knot was cut at a single stroke by operating in reverse. It was found that conducting an ordinary Brinell hardness test on a specimen of accurately known properties, made it possible to determine the load at the exact point of application, regardless of all the variations and distortions of the machine parts under load. Thus, it becomes easily possible, with specimens of uniform and accurately known physical properties, to calculate the actual load from the diameter of a Brinell indentation.

In the accompanying drawings:

FIGURE 1 is a partial side elevation of the testing machine of Patent 2,106,170;

FIGURE 2 is a partial plan view of the same machine;

FIGURE 1A is a view similar to FIGURE 1 indicating a modified feed transmission particularly useful in connection with the present invention;

FIGURE 2A is a side elevation of the same modification;

FIGURE 3 is an exploded perspective of the special parts employed in making a calibrating test on the machine;

FIGURE 4 is a plan view of a standardizing specimen or "coupon";

FIGURE 5 is a side view, partly in section, of the special parts and the pressure arms immediately associated therewith when conducting a calibration;

Figure 6:
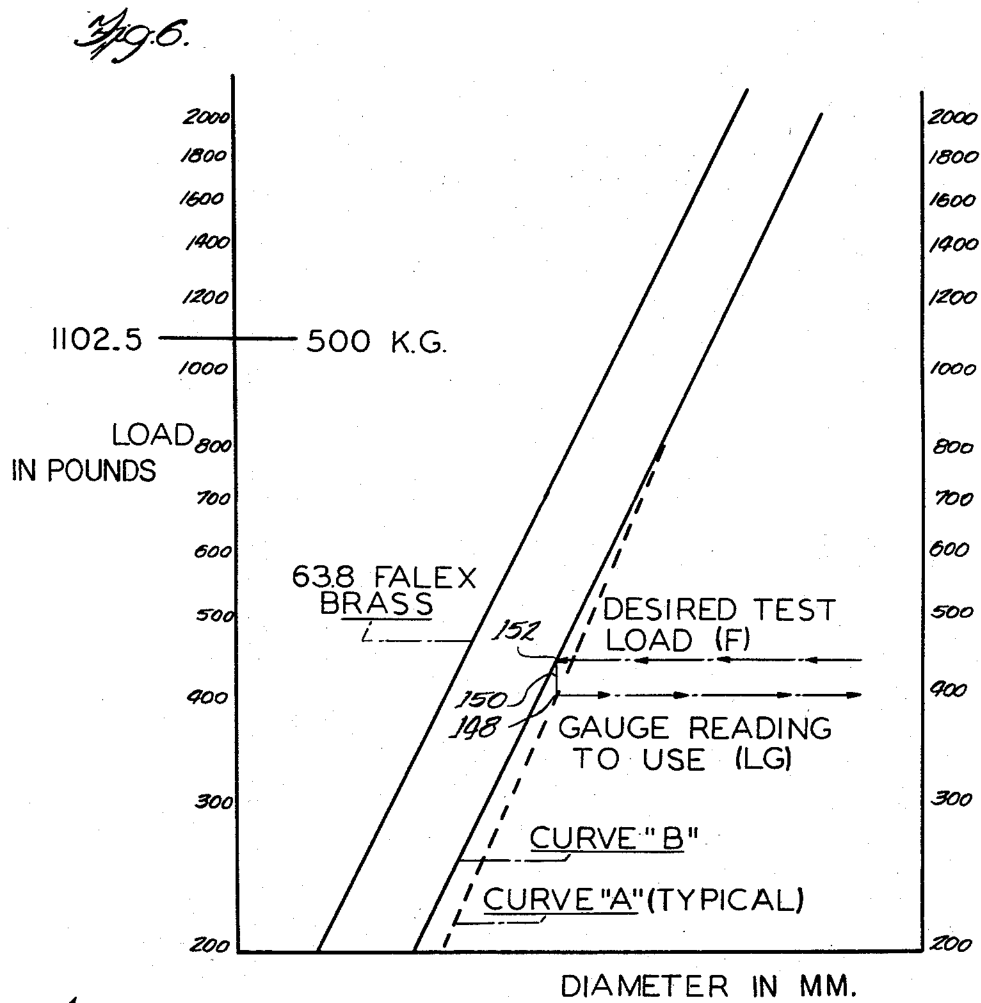
FIGURE 6 is a calibration graph.
Figure 7:
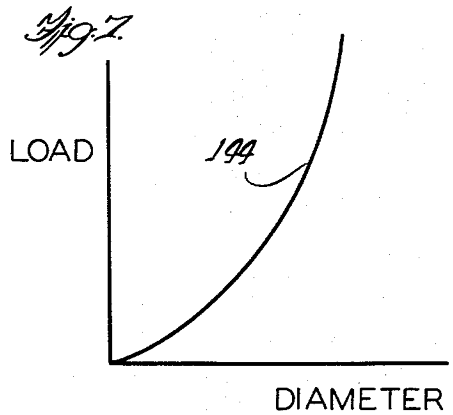

FIGURE 7 indicates the type of curve resulting from plotting observed data showing the loads and the indentation diameters directly, instead of showing the logarithm of the load and the logarithm of the calibration diameter as in FIGURE 6;

FIGURE 1A is a copy of a minor portion of FIGURE 1 indicating a modified feed transmission; and FIGURE 2A is a copy of a portion of FIGURE 2 indicating the same modified feed.

Equipment for substituting a Brinell ball for the wedge-shaped contact pieces of the standard Falex machine is indicated in FIGURE 5. The body 43 and stub shaft 29 and knurled nut 45 correspond to the same parts in FIGURE 6 of Patent 2,106,170. The stub shaft 29 and parts carried thereby perform no function during a Brinell test. The heads 89 and 90 are pressed toward each other by torque transmitted through the vertical shafts 40 and 39 respectively. These parts are identical with and carry the same reference characters with the same parts in FIGURES 3, 5, 6, and 7 of Patent 2,106,170.

It is necessary to provide a special plug 130 for the left hand bore 94. The end of the plug 130 is concave and a carefully machined fit for the Brinell ball 132, which is shown pressed against the test specimen 134, commonly called a "coupon."

Anvil means are provided for receiving the thrust of the ball 132 against the coupon 134. The plug 136 is threaded in the right hand head 90 and has fitting engagement with a thrust ball 138, preferably, though not necessarily, of larger diameter than the ball 132. Between the ball 138 and the coupon 134, I interpose the back-up plug 140 having a plane surface to abut the coupon 134 and a concave end at 142 to ride on the ball 138. It will be obvious that the entire Falex machine will press the parts on opposite sides of the coupon 134 toward each other, just as the test blocks of the ordinary Falex assembly are pressed against the rotating shaft driven by the stub shaft 29 for a fraction test of lubricant.

There is thus applied to the ball 132 and the coupon 134 compressive forces pressing them together and causing the ball to indent the coupon. These forces are transmitted through the compression spring 56 and the spring constant of that spring is such that, long before the final penetration is reached, the shortening of the spring due to any increment of load has become many times greater than the increment in the distance by which the ball 132 advances into the coupon 134 due to the increased load. Therefore, with the ratchet wheel 62 moving through tiny increments several hundred times to compress the spring 56, the time-load function during successive tests is predetermined as to both time and load.

It is an interesting and unexpected by-product of the procedure according to the invention that this constancy in the rate of application of the load can achieve more accurate Brinell tests for determining the hardness of a specimen of unkown hardness than any standard Brinell machine of which I have knowledge.

It is well known that in making Brinell indentations in standard Brinell machines, the uniformity of the rate of application of the load must be controlled with considerable accuracy to preclude erratic variations in the results. Even attempting to check Brinell indentations by calibrated loads on the well-known Olsen or Baldwin-Brinell testing machines is difficult as it is almost impossible to insure holding a constant increase in the load while the Brinell indentation is being formed. In the case of mild steels and hard metals, Brinell indentations can be made with reliable results in about 15 seconds, but non-ferrous metals require a slower application and great care.

With the automatic load-applying mechanism of the Falex machine, the load is applied in vary small increments and the entire time-load history is substantially identical on successive tests, because a constant speed motor is used. This completely predetermined loading history, so far as I am aware, is not available in any standard Brinell testing machine, which is materially subject to variations due to the operator conducting the test, who tries to operate uniformly but cannot due to the human factor. On this account, it is possible with Falex machines to conduct a Brinell test with a materially higher accuracy than with any standard Brinell machine.

It is emphasized that during the process of making a Brinell indentation, the metal being deformed passes beyond the elastic limit and the location and area of the portions of the metal that pass beyond the elastic limit at different times depend on the depth of the previous penetration. On this account, it is not surprising that the closest theoretical, mathematical equations used in connection with Brinell testing are to some extent empirical.

The actual readings taken in such a test define a curved line concave upwardly and of variable curvature, when plotted with the diameter of the impression on one axis and the applied load on another axis at right angles to the first. FIGURE 7 indicates the type of curve 144 thus obtained.

It has been discovered by actual test that if the amounts plotted are the logarithms of the diameter and the logarithms of the load, these lines become perfectly straight. This only involves plotting on the type of paper commonly called "log-log" cross-section paper. It is not necessary to know what the equations are that attempt to "fit" the observed phenomena in the Brinell test. It is only necessary to get the experimentally obtained straight lines on log-log paper to prove that, whatever the equations are, or even if there are no theoretically true equations, the straight line solves all the problems of comparison, with or without equations.

One specific operating procedure for making the Brinell calibration test, subject to minor variations depending on circumstances, is substantially as follows:

(1) Support the coupon 134 on a small block 146 so that one edge of it is about 3/32" below the upper surface of the jaws 89 and 90.

(2) Adjust the jaws 89 and 90 so that they are perfectly parallel and the line of force when the load is applied will be a straight line through the center of the ball 132. Since the arms are formed with their ends cut off at right angles to their length, this can be done by placing a steel rule across the face of the jaw and manipulating the set screws 130 and 136 appropriately.

(3) Adjust the right set screw so that it pushes the transfer ball 138 to force the back-up plug 140 about 1/32" beyond the face of the jaw. The left hand set screw 130 is now adjusted to bring the jaws into parallelism and this will occur when the ball 132 projects about 5/32" beyond the face of the left hand jaw 89.

(4) Start the motor and move the pawl into operative position and let the motor run the gauge load up to a reading of 200 pounds. This should be maintained for a timed interval of one minute. By watching the machine as the load sinks a trifle below 200 pounds the pawl 33 can be used to move it up one tooth or so, and a few such small adjustments will normally be needed during the 60-second interval.

(5) At the end of the minute interval, stop the motor and rotate the ratchet wheel 62 in the reverse direction to back off the load until the test coupon is free of the jaws. This completes the first test impression.

(6) The coupon is now moved longitudinally about 3/8", keeping the successive impressions separated from each other by at least two and one-half diameters.

(7) Recheck the jaws for alignment in parallelism, start the motor, and run as before up to 400 pounds and hold that load for a minute and then back off the load to free the test coupon, which completes the second impression.

(8) Make impressions similarly at 600 pounds and 800 pounds by the same identical procedure just recited.

(9) The coupon is now removed and each of the indentations has its diameter measured with a standard Brinnell microscope, taking the average reading of each indentation on three different diameters, 60° apart.

(10) The gauge loads and the diameters thus secured determine four points, which are now plotted on the log-log cross-section paper of FIGURE 6. All four points should fall in a straight line on this chart; and if any one of the points is out of line with the other three, the entire test should be repeated for that particular point, or if necessary, for all the points.

(11) Curve B on FIGURE 6 may be assumed to represent the theoretically perfect curve for the impression diameters, using 37.0 BHN soft annealed copper. Most new machines in substantially perfect adjustment will duplicate this curve almost exactly, but many machines that have seen many years of service will give a slightly shifted, but still perfectly straight line, as indicated in the dash line entitled Curve A in FIGURE 6.

(12) After calibration has determined curve A, the actual accelerated service tests are run on the calibrated machine. It is customary to determine curve A for each machine with maximum care at the factory and send the machine out to the customer with a substantial supply of coupons. Then the customer uses the machine in the ordinary way for the accelerated tests, and every 60 days or so checks the machine by running Brinell impressions on one of the coupons. If any discrepancy shows up, it is preferable to have the machine sent back to the factory for overhaul.

(13) If an actual reading has given a point 148 slightly below the curve B, a vertical line 150 is drawn from the actual reading to the theoretical reading. This means that when the gauge reads an amount X represented by the point 148 on the scale at the left, the actual load on the ball was the slightly higher value corresponding to the point 152 on curve B.

Thus as soon as curve A is available, the calibrating equipment is removed and standard oil-testing equipment can be substituted. There are a wide variety of lubricant tests calling for a wide variety of actual loads, which must be maintained for minutes or hours depending on the conditions of the lubricant test. If the conditions of the lubricant test call for any given load, say 500 pounds, the point on curve B at an exact level with 500 pounds on the chart is the guide for a vertical line extending down a short distance top the dash line A and the point where the vertical line intersects the line A, read on the scale at the left is the exact gauge reading that should be used for the lubricant test.

It is this specific, relatively small correction, that gives the operator of each machine the actual load on the test pieces for the lubricant test. The curve A for each of a dozen different machines may differ slightly from the curve A for all other machines; but when all the machines are thus corrected, it becomes possible to have identical lubricant tests performed on identical lubricants in widely separated places anywhere, and the accuracy with which these different tests made on different machines in different places will agree with each other becomes closely comparable to the accuracy with which any given machine can repeat the reading on the same lubricant at the same place in successive tests.

Where the actual service tests involve hours or days of running, continuous attention to the machine can be sometimes reduced by making the make-up adjustment for constant load automatic.

In FIGURES 1A and 2A, I have indicated a flexible leaf 133 replacing the pitman 33 of FIGURE 1. A stationary bracket 202, provides a pivotal support for the horizontal pintle reach 204 of a lifting lever, having a riser 206, extending down to engage a set screw 208, at the end of a slide 210 projecting from the gauge 81 and actuated by the gauge mechanism.

At the other end of the pintle reach 204, a lifter arm 212 extends out under the free end of the leaf 133. It will be obvious that movement of slide 210 to the left will lift the leaf 133 so that it reciprocates above and out of engagement with the teeth of the ratchet wheel 214, but a reverse movement will let the leaf 133 down to rotate the ratchet wheel and increase the load on spring 56 enough to restore the predetermined loading. Adjustment of set screw 208 changes the setting to any desired terminal load value.

This hit-or-miss transmission in the mechanism for building up the load on spring 56, enables personnel to leave the machine unattended for convenient time intervals during the running of a prolonged accelerated service test. It is equally available for maintaining a substantially constant spring loading during Brinell calibration of the machine, and in making Brinell tests on specimens of unknown hardness.

Other may readily adapt the invention for use under various conditions of service, by employing one or more of the novel features disclosed or equivalents thereof.

As at present advised, with respect to the apparent scope of my invention, I desire to claim the following subject matter:

1. The method of calibrating a lubricant testing machine of the type in which test elements of solid material are moved in frictional contact with each other immersed in lubricant while pressed toward each other under an indirectly indicated force, for testing the quality of the lubricant, and related tests, which comprises: substituting for the test elements and lubricant, a standardized Brinell ball and anvil; interposing between the ball and the anvil a sheet of metal of standardized strength properties; operating the pressure linkage of the testing machine to impress the ball into the specimen; making several impressions at different indicated loads; and ascertaining the exact pressure for each indicated load point by measuring the indentation produced by the ball.

2. A method according to claim 1, in which a plurality of readings are made at different indicated loads and the resultant points are charted by laying out the logarithm of the diameter of the indentation in one direction and in a second direction perpendicular to the first direction, the logarithm of the indicated load on the pressure mechanism of the testing machine; whereby the pressure-diameter graph becomes a straight line and any defective or accidentally erroneous reading is more easily identified; and subsequently, in testing lubricants, correcting indicated pressure readings to actual pressures at the contact faces, by means of the pressure-diameter graph secured by the Brinnell tests.

3. A method according to claim 1, in which the observed indentation diameters and applied loads are graphically recorded by plotting the indentation diameter, and the applied load on log-log paper, whereby the graph curve becomes a straight line, and quick reading of the plotted values is facilitated.

4. A method according to claim 1 in which the standardized metal specimens employed are of non-ferrous metal.

5. A method according to claim 4 in which the specimen is of soft annealed copper of accurately predetermined hardness.

6. A method according to claim 4 in which the time-force history of the Brinnell test consists of a stairway of very small increments of force added automatically at uniform predetermined time intervals, and maintained at a final plateau value for a minimum of sixty seconds.

References Cited by the Examiner

UNITED STATES PATENTS

| | | | |
|---|---|---|---|
| 2,106,170 | 1/38 | Faville | 73—10 |
| 2,195,451 | 4/40 | Edwards | 73—81 |
| 2,834,202 | 5/58 | Cook | 73—81 |
| 3,050,978 | 8/62 | Livermont | 73—1 |

RICHARD C. QUEISSER, *Primary Examiner.*

JOSEPH P. STRIZAK, *Examiner.*